(12) United States Patent
Thomsen et al.

(10) Patent No.: US 12,547,503 B1
(45) Date of Patent: Feb. 10, 2026

(54) SYSTEMS AND METHODS FOR IMPROVING PERFORMANCE OF LOG BUFFERS

(71) Applicant: SAP SE, Walldorf (DE)

(72) Inventors: Dirk Thomsen, Heidelberg (DE); Christoph Roterring, Sinsheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/932,332

(22) Filed: Oct. 30, 2024

(51) Int. Cl.
*G06F 11/00* (2006.01)
*G06F 11/14* (2006.01)
*G06F 16/176* (2019.01)

(52) U.S. Cl.
CPC ...... *G06F 11/1466* (2013.01); *G06F 11/1451* (2013.01); *G06F 16/1774* (2019.01)

(58) Field of Classification Search
CPC .............. G06F 11/1466; G06F 16/1774; G06F 11/1451
USPC .................................................. 707/683–686
See application file for complete search history.

(56) References Cited

U.S. PATENT DOCUMENTS

2015/0355975 A1* 12/2015 Wang .................. G06F 16/2358
707/683
2025/0094411 A1* 3/2025 Ivey ..................... G06F 16/2379

* cited by examiner

*Primary Examiner* — Jason B Bryan
(74) *Attorney, Agent, or Firm* — Fountainhead Law Group, PC

(57) ABSTRACT

Some embodiments provide a non-transitory machine-readable medium that stores a program to write a redo log for operations performed to modify data within a database. The program sets a throttle mass modification flag when a ring list of log buffers is full and unable to write an additional log entry at this point in time. When the throttle mass modification flag is set, the writing of the redo log for mass operations is blocked or delayed, thereby reducing the delay experienced when writing user operations into the redo log. This can improve the user experience.

20 Claims, 9 Drawing Sheets

SYSTEMS AND METHODS FOR IMPROVING PERFORMANCE OF LOG BUFFERS

BACKGROUND

Many companies utilize database servers to manage and analyze large amounts of data. To maintain consistency in the database, savepoints or checkpoints are used. A savepoint is a snapshot of the database at a particular point in time and the database may be restored by loading the savepoint. In addition to savepoints, the database server also maintains a redo log. A redo log is a log of database manipulations that have been performed since the last savepoint. If an issue arises in the database server such as a crash, an application running on the database server can reset the database server, restore from the last savepoint, and then implement the changes in the redo log to incrementally restore the database to its most recent state as stored in the redo log.

As an application executes operations to modify data in the database server, log entries are generated to be stored in the redo log. When in-memory log buffers cannot be written to log area on disk fast enough, then the redo log may become temporarily full. This may block the savepoint which hinders performance since it blocks other operations waiting to write into the redo log, thus resulting in the application feeling sluggish to the user. Furthermore, a savepoint cannot be saved while an operation is waiting to be written into the redo log. Thus, there is a need for improved techniques to process operations in a database server.

SUMMARY

In some embodiments, a non-transitory machine-readable medium stores a program executable by at least one processing unit of a device. The program comprises sets of instructions for receiving a first operation to modify data in a database server, acquiring a first consistent change to perform the first operation, executing the first operation to modify the data in the database, generating a first redo log entry associated with the first operation, first determining that an open redo log buffer in a ring list of redo log buffers is full, wherein each log buffer is configured to store a plurality of log entries, switching the open redo log buffer in response to the first determination, wherein switching the open redo log buffer sets a throttle mass modification flag, writing the first redo log entry into the open redo log buffer, releasing the first consistent change, receiving a second operation to modify data in the database, second determining that the second operation is a mass operation, and delaying the acquisition of a second consistent change to perform the second operation in response the second determination and when the throttle mass modification flag is set to true.

In some embodiments, the mass operation is a database maintenance operation that does not originate from a user.

In some embodiments, switching the open redo log buffer includes: identifying that the next redo log buffer in the ring list of redo log buffers is writing to disk, setting the throttle mass modification flag to true based on the identification, and setting the next redo log buffer as the open redo log buffer when the next redo log buffer has finished writing to disk.

In some embodiments, switching the open redo log buffer includes: identifying that the next redo log buffer in the ring list of redo log buffers unused, setting the throttle mass modification flag to false based on the identification, and setting the next redo log buffer as the open redo log buffer.

In some embodiments, the program further comprises set of instructions for receiving a third operation to modify data in a database, third determining that the third operation is not a mass operation, acquiring a third consistent change in response to the third determination and the throttle modification flag, executing the third operation to modify data in the database, generating a second redo log entry associated with the third operation, fourth determining that the open redo log buffer is full, switching the open redo log buffer in response to the fourth determination, writing the second redo log entry into the open redo log buffer, and releasing the third consistent change.

In some embodiments, acquiring the first consistent change include acquiring a read-write lock in shared mode.

In some embodiments, acquisition of the second consistent change is delayed until the throttle mass modification flag is set to false.

In some embodiments, a method comprises receiving a first operation to modify data in a database server, acquiring a first consistent change to perform the first operation, executing the first operation to modify the data in the database, generating a first redo log entry associated with the first operation, first determining that an open redo log buffer in a ring list of redo log buffers is full, wherein each log buffer is configured to store a plurality of log entries, switching the open redo log buffer in response to the first determination, wherein switching the open redo log buffer sets a throttle mass modification flag, writing the first redo log entry into the open redo log buffer, releasing the first consistent change, receiving a second operation to modify data in the database, second determining that the second operation is a mass operation, and delaying the acquisition of a second consistent change to perform the second operation in response the second determination and when the throttle mass modification flag is set to true.

In some embodiments, a system includes a set of processing units and a non-transitory machine-readable medium that stores instructions. The instructions cause at least one processing unit to receive a first operation to modify data in a database server, acquire a first consistent change to perform the first operation, execute the first operation to modify the data in the database, generate a first redo log entry associated with the first operation, first determine that an open redo log buffer in a ring list of redo log buffers is full, wherein each log buffer is configured to store a plurality of log entries, switch the open redo log buffer in response to the first determination, wherein switching the open redo log buffer sets a throttle mass modification flag, write the first redo log entry into the open redo log buffer, release the first consistent change, receive a second operation to modify data in the database, second determining that the second operation is a mass operation, and delay the acquisition of a second consistent change to perform the second operation in response the second determination and when the throttle mass modification flag is set to true.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for processing operations that modify data in a database server. These operations are executed by a database analytics application and can include user operations and mass operations. A user operation is an operation that is initiated by a user of the application. For example, a user operation may be an operation to edit data in the database. A mass operation is an operation that is initiated by the application itself. For example, a mass operation can be an internal housekeeping job such as table repartitioning. These mass operations generally result in large amounts of changes in the database which need to be stored in the redo log. In some embodiments, the application may detect when the redo log is full and prioritize user operations over mass operations when the redo log is full. This is advantageous because it may improve the user experience since it reduced the delay that may be experienced by the user. In one embodiment, the application may delay the execution of mass operations when or while the redo log is full since mass operations result in the generation of many entries in the redo log, which if executed while the redo log is full, may further add to the backlog of entries waiting to be written in the redo log.

Figure 1:
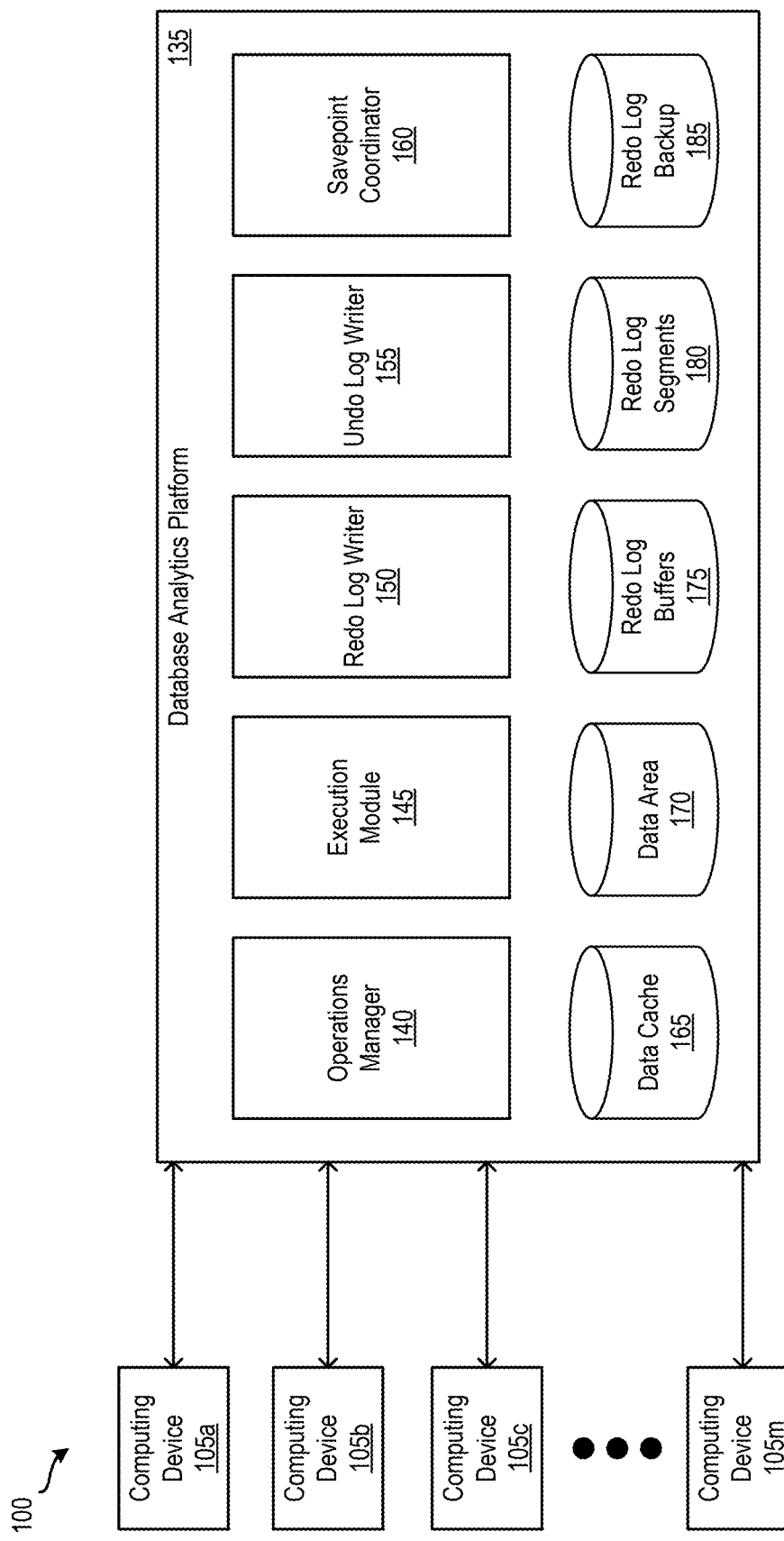
FIG. 1 illustrates a system for processing database operations according to some embodiments.

FIG. 1 illustrates a system for processing database operations according to some embodiments. As shown, system 100 includes computing devices 105a to 105m. Computing devices 105a-105m are operated by users and may transmit user operations to database analytics platform 135. Database analytics platform 135 may execute the user operations to retrieve or modify data in the database. For retrieval, data may be transmitted back to the computing device to be shared with the user on a graphical user interface of a display belonging to the computing device. Database analytics platform 135 includes various modules that support the execution of user operations and mass operations, which include operations manager 140, execution module 145, redo log write 150, undo log write 155, and savepoint coordinator 160. Operations manager 140 is configured to manage the order in which operations (both user operations and mass operations) are executed by the database analytics platform 135. Execution module 145 is configured to execute an operation. Redo log writer 150 is configured to generate the redo log which is used to restore the database in the event of a crash or other issue experienced by the database. Undo log writer 155 is configured to generate the undo log which is used to undo an executed user operation. Lastly, savepoint coordinator 160 is configured to generate a savepoint for the database.

Database analytics platform 135 further includes a plurality of data containers, which include data cache 165, data area 170, redo log buffers 175, redo log segments 180, and redo log backup 185. Data cache 165 is a working memory area that stores data pages that have recently been read or written into data area 170. The data cache is used to improve the performance of the platform by allowing data to be quickly retrieved. Data area 170 is the data repository for the database. Redo log buffers 175, redo log segments 180 and redo log backup 185 all support the generation of the redo log. As mentioned above, the redo log stores modifications made to the database between savepoints so that when a crash or other issue occurs, the redo log can be used to restore the database up to the last modification that was stored in the redo log. When an operation to modify data (both user operations and mass operations) is executed, data analytics platform 135 may generate one or two logs, depending on the implementation details. The first is an undo log which can be used to subsequently undo the operation. The second is a redo log which can be used to restore the database. This invention is focused on the redo log. In order to synchronize the savepoint with the modifications to data, the writing of the undo log, and the writing of the redo log, a read-write lock is introduced. A read-write lock is a synchronization primitive. A savepoint may request an exclusive write lock which means that the database is only accessible by one thread. This means that the redo log cannot be written while the savepoint has the exclusive write lock. This is known as having the read-write lock in exclusive mode. In contrast, a redo log may request a non-exclusive read lock which means that multiple threads may have a non-exclusive read lock in parallel. However, all non-exclusive read locks must be released before a savepoint may be granted an exclusive write lock. This is known as having the read-write lock in shared mode. When writing to the redo log, the redo log may acquire a consistent change, which means to acquiring the read-write lock in shared mode. The redo log may hold the consistent change which means it holds the read-write lock in shared mode while the redo log is being written. Once the redo log is written, the redo log releases the consistent change.

To write the redo log, one or more log entries are generated that correspond to the operation being executed where each log entry is associated with a modification in the database. The log entry is stored in an open log buffer in redo log buffers 175. An open log buffer may be closed when it is full or when an immediate flush is requested. An immediate flush may be requested for example during a commit. Once the log buffer is closed, the next unused redo log buffer in redo log buffers 175 becomes open and log entries are written into the newly opened log buffer. The closed log buffer may wait its turn to enter IO to be written to a redo log segment in redo log segments 180. Redo log segments that become closed are in turn backed up in redo log backup 185 and then reformatted for reuse.

Figure 2:
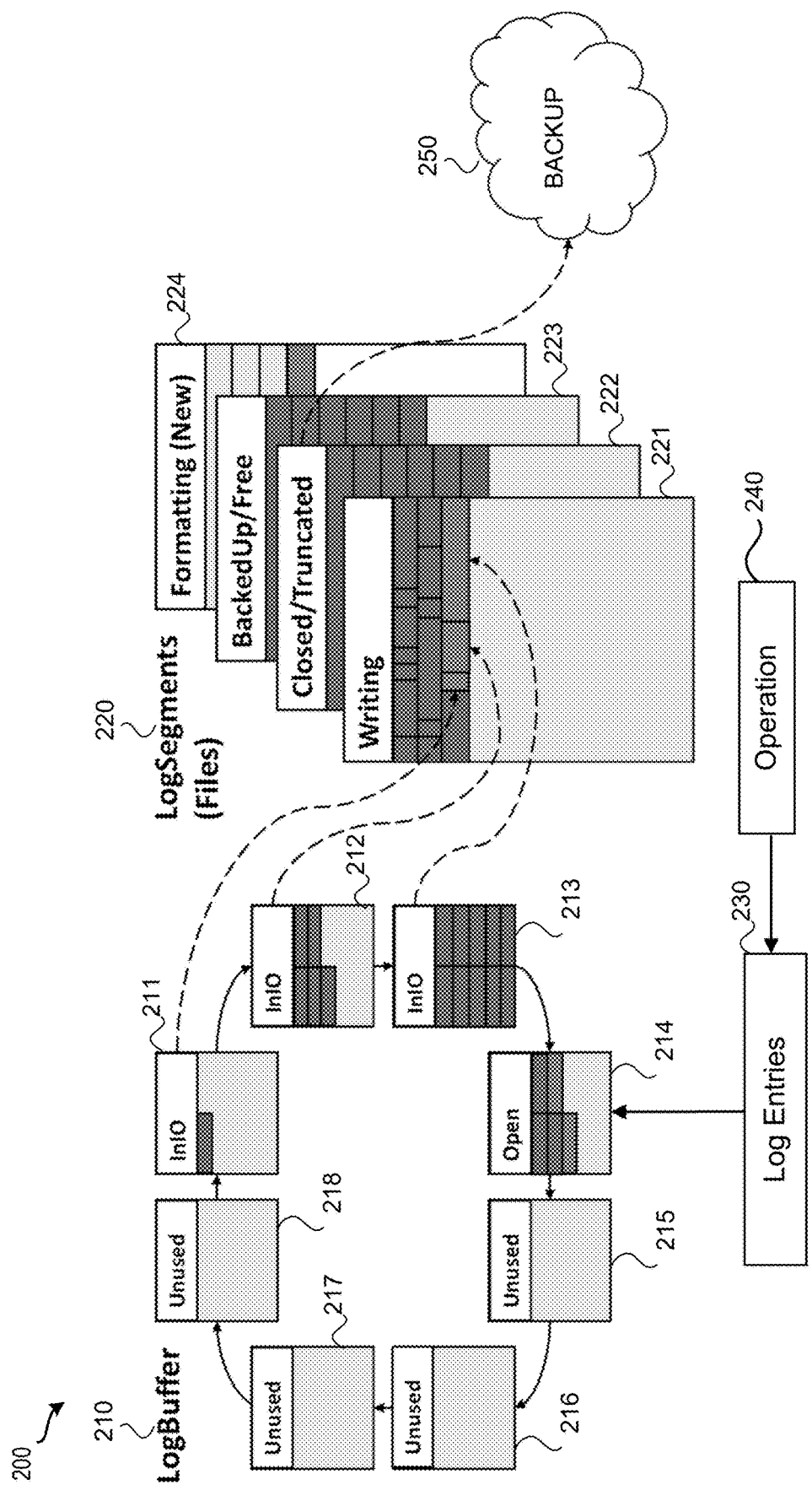
FIG. 2 illustrates a process of writing a redo log according to some embodiments.

FIG. 2 illustrates a process of writing a redo log according to some embodiments. As shown, process 200 includes ring list log buffer 210, log segment 220, log entries 230, and operation 240, and backup 250. After an operation is executed, the operation is written to the redo log. As shown here, operation 240 is processed to generate log entries 230. While multiple log entries are shown here, it is possible for the operation to generate a single log entry. Log entries 230 are in turn written into the ring list log buffer 210. Each log buffer in ring list log buffer 210 has a state which can be set to open, closed, unused, and in-I/O. A log buffer in an open state is the log buffer in which log entries are written into. Ring list log buffer 210 may have a single log buffer that is in an open state. A log buffer in a closed state is a log buffer that contains log entries waiting to be written into log segments but has yet to start writing into log segments. A log buffer in an unused state is a log buffer that is currently empty and can be updated to an open state to receive log entries. A log buffer in an in-I/O state is currently being written to a log segment which in turn is then written to backup 250. In one embodiment, a log buffer in an in-IO state may be formatted once the contents of the log buffer has been written into the log segment so that the log buffer is ready to receive additional log entries.

As shown here, log buffers 211, 212, and 213 have the state in-IO. As such, the log entries within log buffers 211, 212, and 213 are being written into log segment 220. Log segment 220 can have a state which can be writing 221, closed 222, backed-up 223, and formatting 224. Log segment 220 is currently in the writing state and can receive log entries from ring list log buffer 210. Log segment 220 can update to a closed state when log segment 220 can no longer receive additional log segments. Log segment 220 may transition to a closed state 222 from writing state 221 when log segment 220 is full or if a backup time out has been reached. In the closed state, the data stored within log segment 220 can optionally be encrypted for security or truncated to reduce. Log segment 220 can then transition to a backed-up state where the log segment 220 (optionally encrypted or truncated) is backed up to backup 250. Once the backup has completed, log segment 220 can transition to state formatting 224 where the log segment is formatted so that it can be reused. In practice, there may be multiple log segments that are part of a list such as a ring list where the ring list log buffer 210 writes into an active log segment. When the active log segment is closed, the next available log segment may become active to receive log entries from the ring list log buffer.

As shown here, ring list log buffer 210 includes 8 log buffers—log buffers 211-218. Log buffers 211-213 are in state in-IO since the log buffers are writing data to log segment 220. Log buffer 211 has one log entry to write to log segment 220, log buffer 212 has 5 log entries to write to log segment 220, and log buffer 213 has 10 log entries to write to log segment 220. Log buffer 214 is in state open since the log buffer is currently receiving log entries. Log buffer 215-218 are in a state of unused. This means that log buffer 215 can receive log entries after log buffer 214 is full. Similarly, log buffer 216 can receive log entries after log buffer 215 is full.

Figures 3A, 3B:
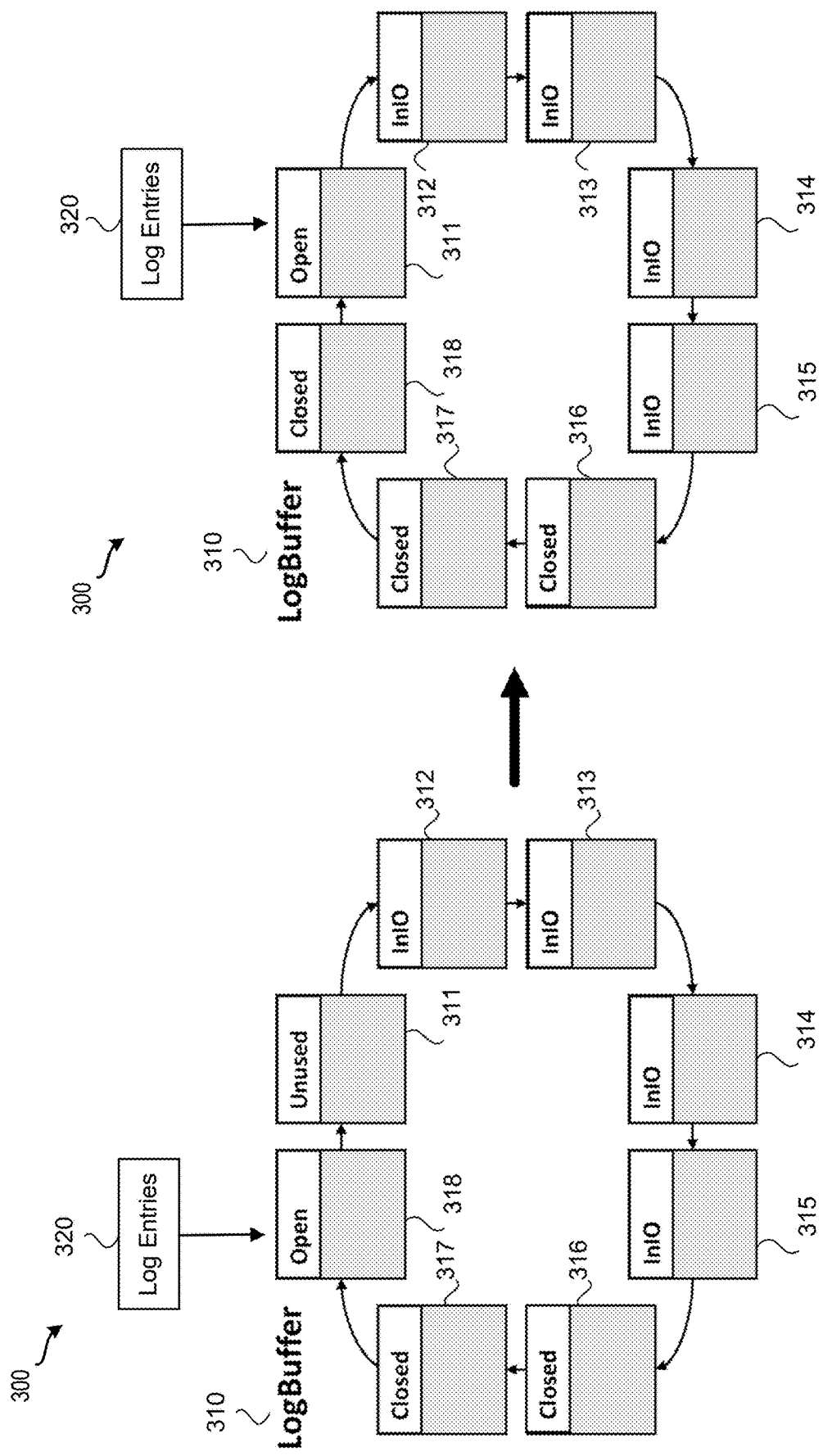
FIGS. 3A and 3B illustrate a ring list of log buffers according to some embodiments.

FIGS. 3A and 3B illustrate a ring list of log buffers according to some embodiments. A ring list of log buffers may at times become full and unable to store additional log entries when the state of all of the log buffers in the ring list are either closed or in-IO. For example, an open log buffer may be changing its state to closed and the next log buffer in the ring list is still in the in-IO state (i.e., the next log buffer is still writing its contents to the log segment). In this scenario, the application may experience a lag in performance since operations submitted by the user may be delayed in processing as the application waits for a log buffer to be open and for existing log entries to be written into the newly opened log buffer. FIG. 3A illustrates ring list 310 as log buffer 318 is about to transition from open state open to closed state. As shown, ring list 310 includes log buffers 311-318. Log buffers 312-315 are in-IO state which means that the contents of the log buffers 312-316 are being written into a log segment. Log buffers 316-317 are in a closed state which means that log buffers 316 and 417 contain log entries that are awaiting to be written into the log segment. In one embodiment, a maximum number of log buffers can be written into the log segment at one time. Here, there is a maximum of four log buffers that can simultaneously be written into the log segment at once. Log buffer 318 is in an open state which means that log entries 320 are being written into log buffer 318. As mentioned above, log entries may be generated from operations (user or mass). FIG. 3B illustrates ring list 310 as log buffer 318 transitions to a closed state. As shown, log buffer 318 is in a closed state, which means that log buffer 318 can no longer write additional log entries. As such, the next log buffer (log buffer 311) transitions from an unused state to an open state. Log entries 320 are now written into log buffer 311. If log buffer 311 changes to a closed state (either because the log buffer is full and can no longer write additional log entries or because an immediate flush is requested) while log buffer 312 is still in in-IO state, then ring list 310 is full. The writing of log entries 320 may continue once log buffer 312 changes to an unused state which means that log buffer 312 has completed writing its contents to the log segment and has optionally been formatted. Once in the unused state, log buffer 312 may transition to an open state which then log entries 320 may be written into log buffer 312.

Figure 4:
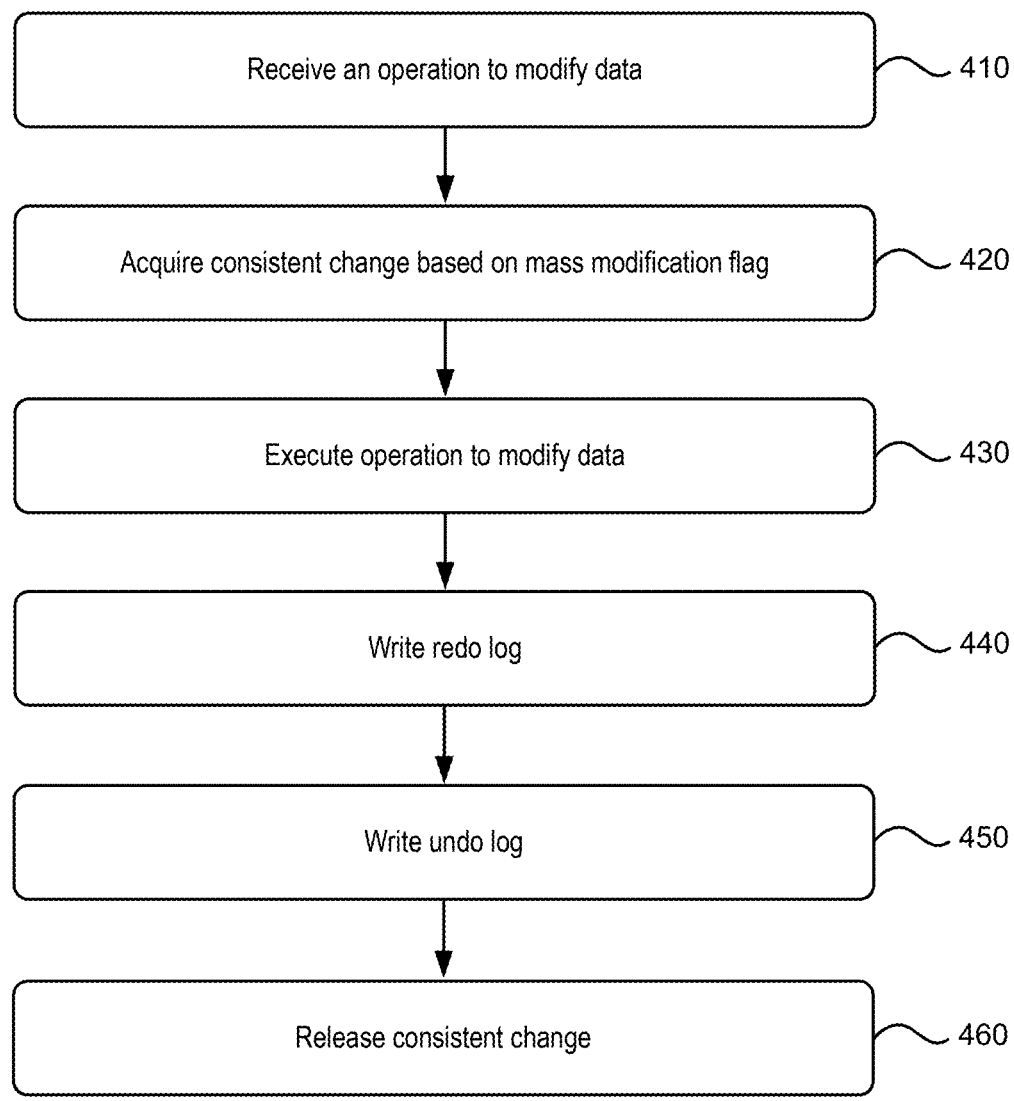
FIG. 4 illustrates a workflow to process an operation to modify data according to some embodiments.

FIG. 4 illustrates a workflow to process an operation to modify data according to some embodiments. Workflow 400 may be implemented in computer readable code and executed by a processor. In one embodiment, workflow 400 may be implemented in execution module 145 of FIG. 1. Workflow 400 begins by receiving an operation to modify data at 410. The operation may be a mass operation or a user operation. In response to receiving the operation, process 400 may acquire consistent change at 420. Acquiring the consistent change may be based on a mass modification flag which is described below. During the acquisition of the consistent change, a shared lock (i.e. read lock) on the database may be acquired. This shared lock is a non-exclusive lock which means that additional shared locks may be acquired on the database simultaneously but an exclusive lock (i.e., write lock) on the database may only be taken once all the non-exclusive locks have been released. This ensures that the data is in a consistent state. In one embodiment, acquiring the consistent change may include checking whether the operation is a mass operation or a user operation. If the operation is a mass operation and the ring list is full, then the acquisition of a shared lock for the operation may be blocked or delayed as a means to throttle the mass operations to give the ring list a chance to catch up with writing the log entries. This is because mass operations generate a large amount of log entries so by delaying or blocking mass operations, user operations are prioritized which as a result improves the overall user experience since the user will experience less lag. This is particularly useful when a ring list is full and waiting for a log buffer to become unused and ready to be set to an open state. In some embodiments, mass operations may be split into multiple smaller operations. The benefit of splitting the mass operation is that smaller operations hold the consistent change (i.e. the time between acquiring the consistent change and releasing the consistent change) for a shorter period of time. Holding consistent change for a shorter amount of time may be advantageous so that other operations experience less delay in execution.

Workflow 400 continues by executing the operation to modify data at 430. This may result in data within the database being modified. Workflow 400 continues by writing the redo log at 440 and writing the undo log at 450. As mentioned above, the redo log saves the changes made to the database during the operation as log entries and writing the undo log saves the operation so that it may be undone. In practice, executing the operation to modify data, writing the redo log, and writing the undo log can occur in any order or simultaneously. Once the redo log is written, the undo log is written, and the operation to modify the data has been executed, workflow 400 continues by releasing the consistent change at 460. Releasing the consistent change can include release the shared lock on the database. Once the consistent change has been released, processing the operation has been completed. In some embodiments, an operation such as a mass operation may acquire consistent change multiple times and modify the data in the database multiple times. This may be advantageous particularly in a parallel processing environment where the mass operation may be split into multiple operations which may be processed in parallel.

Figure 5:
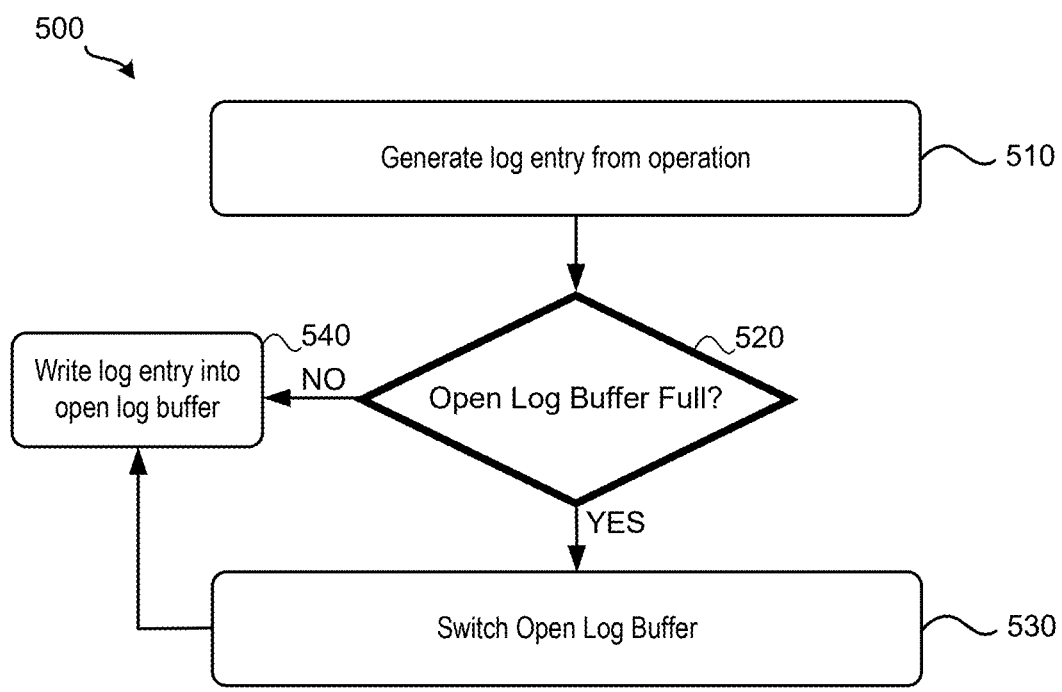
FIG. 5 illustrates a workflow for writing a redo log according to some embodiments.

FIG. 5 illustrates a workflow for writing a redo log according to some embodiments. Workflow 500 may be implemented in computer readable code and executed by a processor. In one embodiment, workflow 500 may be implemented in redo log writer 150 of FIG. 1. Workflow 500 may begin by generating a log entry from an operation at 510. The operation may be an operation that has been executed or will be executed to modify data in the database. In one embodiment, multiple log entries are generated for a given operation. For example, mass operations may generate multiple log entries. Workflow 500 continues by checking whether the open log buffer is full at 520. In other embodiments, workflow 500 may check whether an immediate flush is requested for the open log buffer, such as during a commit at 520. If the log buffer is not full (or an immediate flush is not requested), then workflow 500 continues by writing the log entry into the open log buffer at 540. Alternatively, if the open log buffer is full (or an immediate flush is requested), then workflow 500 continues by switching the open log buffer to the next available log buffer at 530. Details on how to switch to the next available log buffer is described in FIG. 6.

Figure 6:
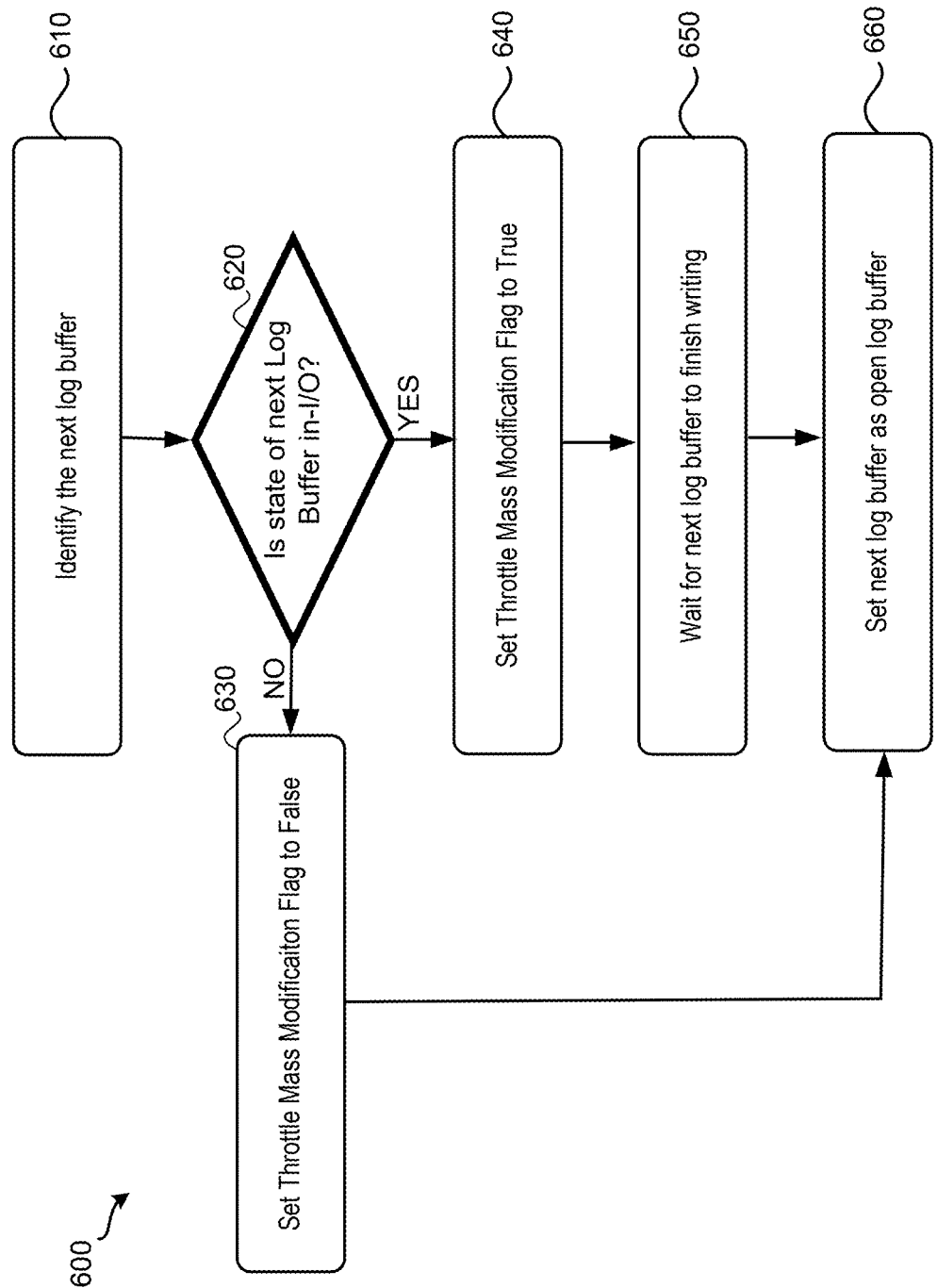
FIG. 6 illustrates a workflow for switching log buffers in a list of log buffers according to some embodiments.

FIG. 6 illustrates a workflow for switching log buffers in a list of log buffers according to some embodiments. Workflow 600 may be implemented in computer readable code and executed by a processor. The list may be based on any data structure, including a circular linked list, circular double linked list, and others. In one embodiment, workflow 600 may be implemented in redo log writer 150 of FIG. 1. Workflow 600 begins by identifying the next log buffer at 610. In one embodiment, the next log buffer is identified as the next log buffer after the currently open log buffer in the linked list. In another embodiment, the next log buffer is identified as the log buffer in the list of log buffers that is in an unused state and if no log buffers are in an unused state, then the next log buffer is identified as the log buffer that is closest to being finished writing to a log segment and therefore closest to being in an unused state. Workflow 600 continues by determining if the state of the next log buffer is in-IO at step 620. If the next log buffer is in-IO state, that means that the next log buffer is currently writing log entries into a log segment and therefore is unable to receive new log entries. In this condition, the list of log buffers is full and is unable to write additional log entries into the list. If the next log buffer is in-IO state, workflow 600 continues by setting the throttle mass modification flag to true at 640 and then waits for the next log buffer to finish writing to the log segment at 650. Setting the throttle mass modification flag instructs the application to delay or block the acquisition of consistent change for mass operations. In one embodiment, the acquisition of consistent change as shown at step 420 of FIG. 4 checks to see whether the operation is a mass operation and whether the throttle mass modification flag is set to true. If the throttle mass modification flag is set to true and the operation is a mass operation, then the acquisition of the read-write lock may be delayed or blocked, which in turn delays or blocks the mass operation from being written into the redo log. Advantages of blocking or delaying the writing of the redo long for mass operations when the list of redo log buffers is full is that user operations may be performed sooner which improves the user experience of the application. Once the next log segment has completed writing to the log segment and has transitioned to an unused state (this may require formatting the next log buffer), workflow 600 continues by setting the state of the next log buffer to an open state, signifying that the next log buffer is now the open log buffer at 660.

Back to step 620, if the state of the next log buffer is not in-IO (for example, the next log buffer is in an unused state), then workflow 600 continues by setting the throttle mass modification flag to false at 630. Setting the throttle mass modification flag to false means that the ring list log buffer is no longer full since the ring list was able to iterate to the next log buffer and the log buffer was not being used. In other words, the throttle mass modification flag signifies whether to throttle the writing of mass operations. If the throttle mass modification flag is set to true, then mass modifications are blocked or delayed from writing in the redo log. However, if the throttle mass modification flag is set to false, then mass operations are written into the redo log when they are received for processing. As shown here, a throttle mass modification flag that has been set to true because during switching of the open log buffer the next log buffer is in-IO state will remain set to true until the next time the open log buffer is to be switched and the next log buffer is not in an in-IO state.

Figure 7:
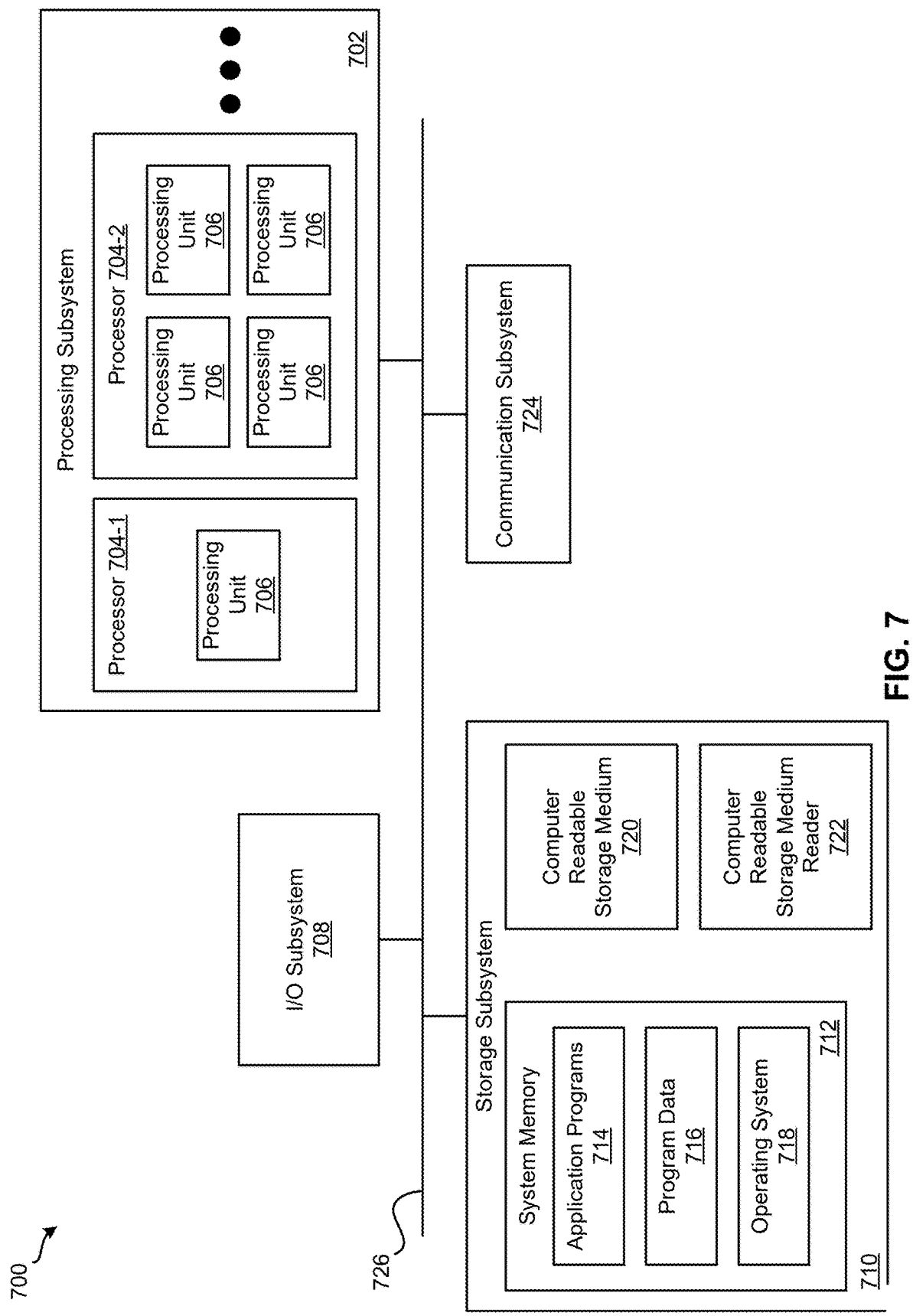
FIG. 7 illustrates an exemplary computer system 700 for implementing various embodiments described above.

FIG. 7 illustrates an exemplary computer system 700 for implementing various embodiments described above. For example, computer system 700 may be used to implement data analytics platform 135 of FIG. 1. Computer system 700 may be a desktop computer, a laptop, a server computer, or any other type of computer system or combination thereof. Some or all elements of operations manager 140, execution module 145, redo log writer 150, undo log write 155, and savepoint coordinator 160, or combinations thereof can be included or implemented in computer system 700. In addition, computer system 700 can implement many of the operations, methods, and/or processes described above. As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to workflows 400, 500 and 600.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., application 115), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 7, and Palm OS, WebOS operating systems.

Computer-readable storage medium 720 may be a non-transitory computer-readable medium configured to store software (e.g., programs, code modules, data constructs, instructions, etc.). Many of the components and/or workflows described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
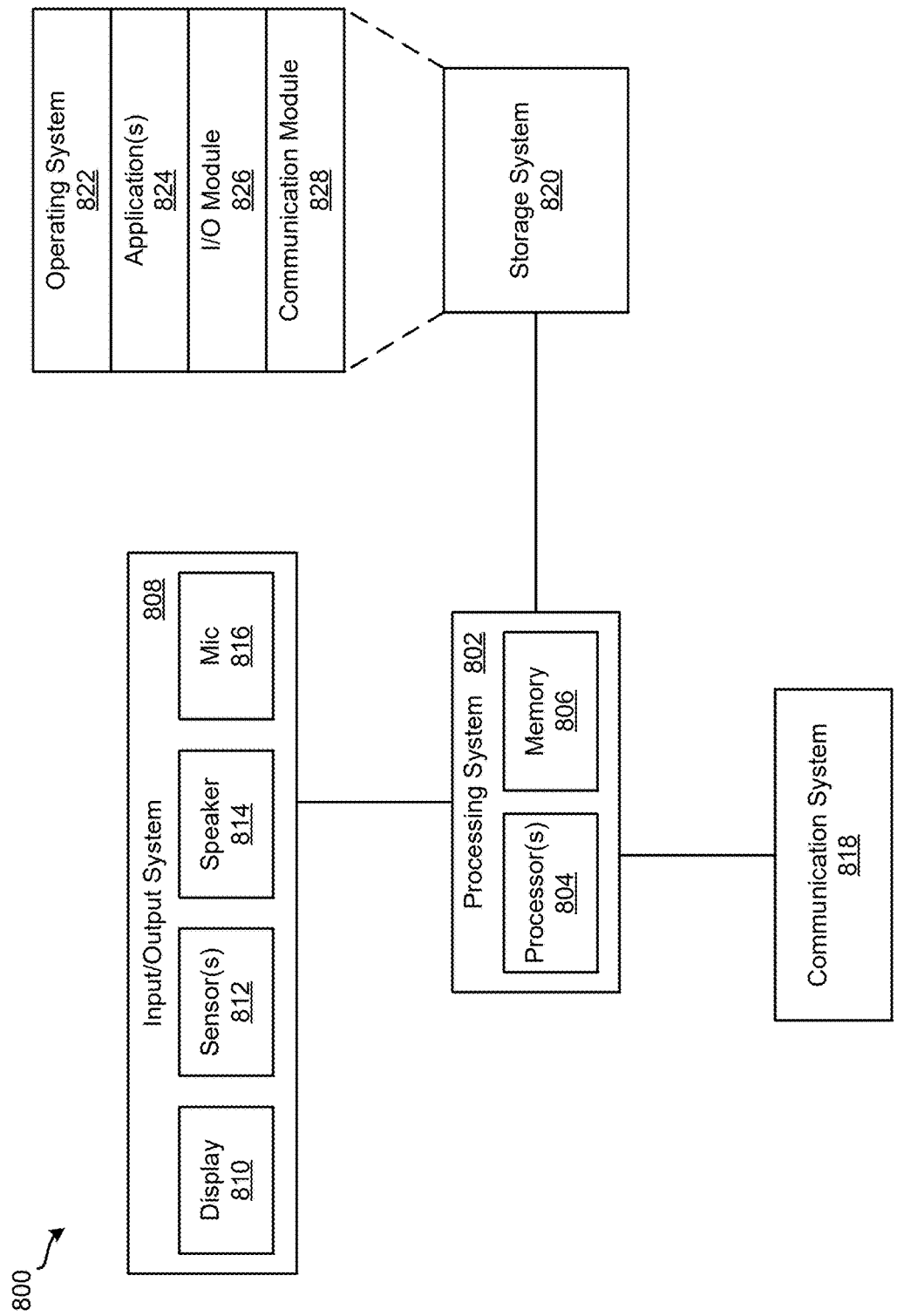
FIG. 8 illustrates an exemplary computing device 800 for implementing various embodiments described above.

FIG. 8 illustrates an exemplary computing device 800 for implementing various embodiments described above. For example, computing device 800 may be used to implement devices client device 105a of FIG. 1. Computing device 800 may be a cellphone, a smartphone, a wearable device, an activity tracker or manager, a tablet, a personal digital assistant (PDA), a media player, or any other type of mobile computing device or combination thereof. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrate into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/

Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
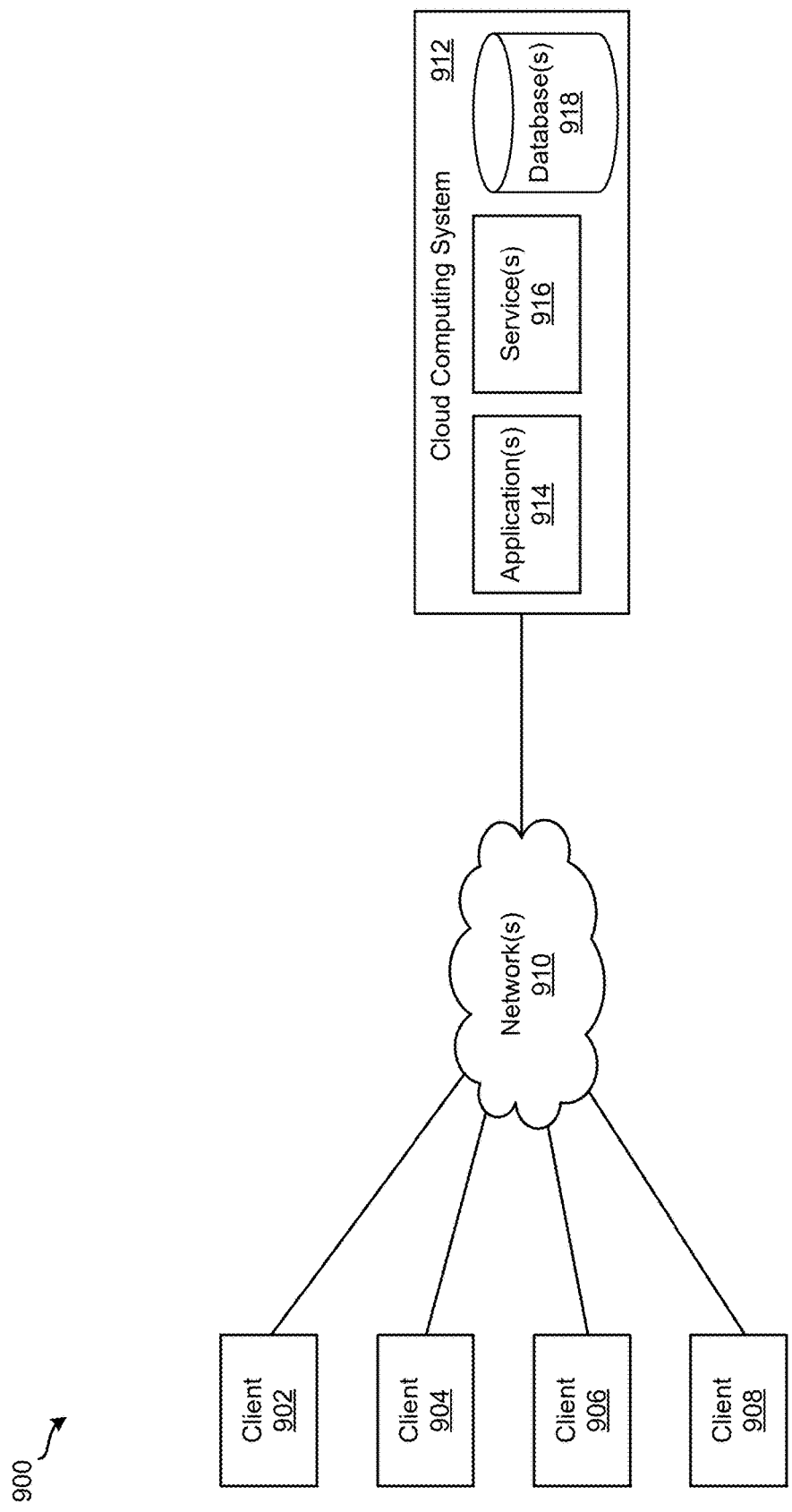
FIG. 9 illustrates an exemplary system 900 for implementing various embodiments described above.

FIG. 9 illustrates an exemplary system 900 for implementing various embodiments described above. For example, cloud computing system 912 may be used to implement data analytics platform 135 of FIG. 1. As shown, system 900 includes client devices 902-908, one or more networks 910, and cloud computing system 912. Cloud computing system 912 is configured to provide resources and data to client devices 902-908 via networks 910. In some embodiments, cloud computing system 900 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 900 may provide applications 914, services 916, and databases 918 to any number of different customers in a self-service, subscription-based, elastically scalable, reliable, highly available, and secure manner.

In some embodiments, cloud computing system 900 may be adapted to automatically provision, manage, and track a customer's subscriptions to services offered by cloud computing system 900. Cloud computing system 900 may provide cloud services via different deployment models. For example, cloud services may be provided under a public cloud model in which cloud computing system 900 is owned by an organization selling cloud services and the cloud services are made available to the general public or different industry enterprises. As another example, cloud services may be provided under a private cloud model in which cloud computing system 900 is operated solely for a single organization and may provide cloud services for one or more entities within the organization. The cloud services may also be provided under a community cloud model in which cloud computing system 900 and the cloud services provided by cloud computing system 900 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 912 is referred to as a "cloud service." Typically, servers and systems that make up cloud computing system 912 are different from the on-premises servers and systems of a customer. For example, cloud computing system 912 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transport protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, storages data cache 165, data area 195, redo log buffers 175, redo log segments 180, and redo log backup 185 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 900. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-1208 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
    receiving a first operation to modify data in a database server;
    acquiring a first consistent change to perform the first operation;
    executing the first operation to modify the data in the database;
    generating a first redo log entry associated with the first operation;
    first determining that an open redo log buffer in a ring list of redo log buffers is full, wherein each log buffer is configured to store a plurality of log entries;
    switching the open redo log buffer in response to the first determination, wherein switching the open redo log buffer sets a throttle mass modification flag;
    writing the first redo log entry into the open redo log buffer;
    releasing the first consistent change;
    receiving a second operation to modify data in the database;
    second determining that the second operation is a mass operation; and
    delaying the acquisition of a second consistent change to perform the second operation in response the second determination and when the throttle mass modification flag is set to true.

2. The non-transitory machine-readable medium of claim 1, wherein the mass operation is a database maintenance operation that does not originate from a user.

3. The non-transitory machine-readable medium of claim 1, wherein switching the open redo log buffer includes:
    identifying that the next redo log buffer in the ring list of redo log buffers is writing to disk;
    setting the throttle mass modification flag to true based on the identification; and
    setting the next redo log buffer as the open redo log buffer when the next redo log buffer has finished writing to disk.

4. The non-transitory machine-readable medium of claim 1, wherein switching the open redo log buffer includes:
    identifying that the next redo log buffer in the ring list of redo log buffers unused;
    setting the throttle mass modification flag to false based on the identification; and
    setting the next redo log buffer as the open redo log buffer.

5. The non-transitory machine-readable medium of claim 1, further comprising:
    receiving a third operation to modify data in a database;
    third determining that the third operation is not a mass operation;
    acquiring a third consistent change in response to the third determination and the throttle modification flag;
    executing the third operation to modify data in the database;
    generating a second redo log entry associated with the third operation;
    fourth determining that the open redo log buffer is full;
    switching the open redo log buffer in response to the fourth determination;
    writing the second redo log entry into the open redo log buffer; and
    releasing the third consistent change.

6. The non-transitory machine-readable medium of claim 1, wherein acquiring the first consistent change include acquiring a read-write lock in shared mode.

7. The non-transitory machine-readable medium of claim 1, wherein the acquisition of the second consistent change is delayed until the throttle mass modification flag is set to false.

8. A method comprising:
    receiving a first operation to modify data in a database server;
    acquiring a first consistent change to perform the first operation;
    executing the first operation to modify the data in the database;
    generating a first redo log entry associated with the first operation;
    first determining that an open redo log buffer in a ring list of redo log buffers is full, wherein each log buffer is configured to store a plurality of log entries;
    switching the open redo log buffer in response to the first determination, wherein switching the open redo log buffer sets a throttle mass modification flag;
    writing the first redo log entry into the open redo log buffer;
    releasing the first consistent change;
    receiving a second operation to modify data in the database;
    second determining that the second operation is a mass operation; and
    delaying the acquisition of a second consistent change to perform the second operation in response the second determination and when the throttle mass modification flag is set to true.

9. The method of claim 8, wherein the mass operation is a database maintenance operation that does not originate from a user.

10. The method of claim 8, wherein switching the open redo log buffer includes:
    identifying that the next redo log buffer in the ring list of redo log buffers is writing to disk;
    setting the throttle mass modification flag to true based on the identification; and
    setting the next redo log buffer as the open redo log buffer when the next redo log buffer has finished writing to disk.

11. The method of claim 8, wherein switching the open redo log buffer includes:
    identifying that the next redo log buffer in the ring list of redo log buffers unused;
    setting the throttle mass modification flag to false based on the identification; and
    setting the next redo log buffer as the open redo log buffer.

12. The method of claim 8, further comprising:
receiving a third operation to modify data in a database;
third determining that the third operation is not a mass operation;
acquiring a third consistent change in response to the third determination and the throttle modification flag;
executing the third operation to modify data in the database;
generating a second redo log entry associated with the third operation;
fourth determining that the open redo log buffer is full;
switching the open redo log buffer in response to the fourth determination;
writing the second redo log entry into the open redo log buffer; and
releasing the third consistent change.

13. The method of claim 8, wherein acquiring the first consistent change include acquiring a read-write lock in shared mode.

14. The method of claim 8, wherein the acquisition of the second consistent change is delayed until the throttle mass modification flag is set to false.

15. A system comprising:
a set of processing units; and
a non-transitory machine-readable medium storing instructions that when executed by at least one processing unit in the set of processing units cause the at least one processing unit to:
receive a first operation to modify data in a database server;
acquire a first consistent change to perform the first operation;
execute the first operation to modify the data in the database;
generate a first redo log entry associated with the first operation;
first determine that an open redo log buffer in a ring list of redo log buffers is full, wherein each log buffer is configured to store a plurality of log entries;
switch the open redo log buffer in response to the first determination, wherein switching the open redo log buffer sets a throttle mass modification flag;
write the first redo log entry into the open redo log buffer;
release the first consistent change;
receive a second operation to modify data in the database;
second determining that the second operation is a mass operation; and
delay the acquisition of a second consistent change to perform the second operation in response the second determination and when the throttle mass modification flag is set to true.

16. The system of claim 15, wherein the mass operation is a database maintenance operation that does not originate from a user.

17. The system of claim 15, wherein switching the open redo log buffer includes:
identifying that the next redo log buffer in the ring list of redo log buffers is writing to disk;
setting the throttle mass modification flag to true based on the identification; and
setting the next redo log buffer as the open redo log buffer when the next redo log buffer has finished writing to disk.

18. The system of claim 15, wherein switching the open redo log buffer includes:
identifying that the next redo log buffer in the ring list of redo log buffers unused;
setting the throttle mass modification flag to false based on the identification; and
setting the next redo log buffer as the open redo log buffer.

19. The system of claim 15, receiving a third operation to modify data in a database;
third determining that the third operation is not a mass operation;
acquiring a third consistent change in response to the third determination and the throttle modification flag;
executing the third operation to modify data in the database;
generating a second redo log entry associated with the third operation;
fourth determining that the open redo log buffer is full;
switching the open redo log buffer in response to the fourth determination;
writing the second redo log entry into the open redo log buffer; and
releasing the third consistent change.

20. The system of claim 15, wherein acquiring the first consistent change include acquiring a read-write lock in shared mode.

* * * * *